May 16, 1950 E. W. MARLOWE 2,507,728

INDUCTIVE COMMUNICATION SYSTEM BETWEEN MOVING VEHICLES AND CONVENTIONAL TELEPHONE SUBSCRIBERS

Filed Aug. 24, 1948 3 Sheets-Sheet 1

INVENTOR.
Elbert W. Marlowe
BY
HIS ATTORNEY

May 16, 1950 E. W. MARLOWE 2,507,728

INDUCTIVE COMMUNICATION SYSTEM BETWEEN MOVING VEHICLES AND CONVENTIONAL TELEPHONE SUBSCRIBERS

Filed Aug. 24, 1948 3 Sheets-Sheet 2

INVENTOR.
Elbert W. Marlowe
BY
HIS ATTORNEY

INVENTOR.
Elbert W. Marlowe
BY
HIS ATTORNEY

Patented May 16, 1950 2,507,728

UNITED STATES PATENT OFFICE 2,507,728

INDUCTIVE COMMUNICATION SYSTEM BETWEEN MOVING VEHICLES AND CONVENTIONAL TELEPHONE SUBSCRIBERS

Elbert W. Marlowe, Wilkinsburg, Pa., assignor to The Union Switch & Signal Company, Swissvale, Pa., a corporation of Pennsylvania Application August 24, 1948, Serial No. 45,896

11 Claims. (Cl. 179—82)

Figure 1A:
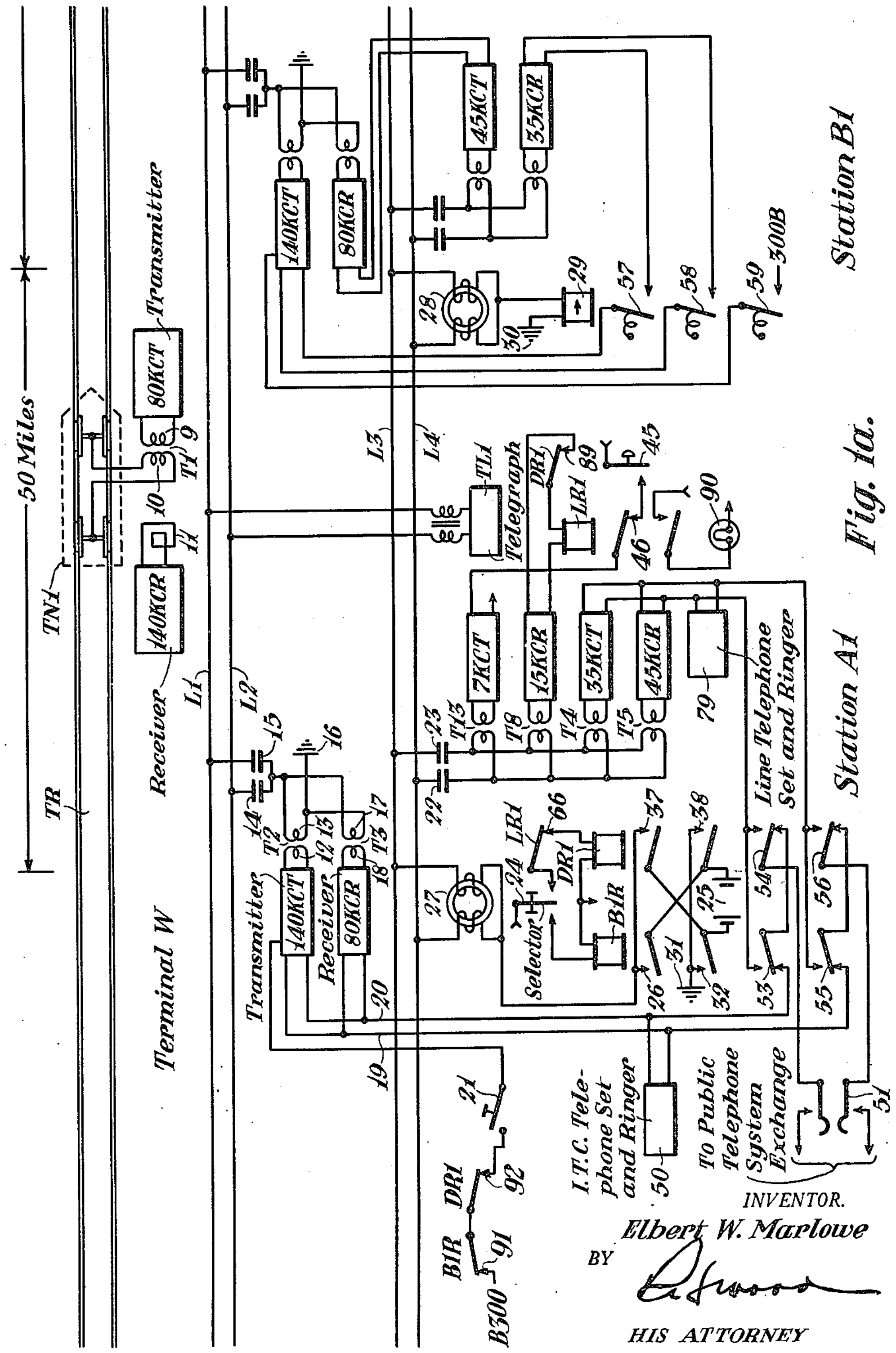

My invention relates to communication systems for vehicles and more particularly to a system which enables a passenger on a vehicle en route to telephone to an office remote from the trackway along which the vehicle is moving.

Facilities which provide telephone communication between a passenger on a moving vehicle, such as a railway train, and a party at a remote office located off the railway have been proposed. These facilities ordinarily include a space communication link to bridge the gap between the moving train and a wayside station and a line telephone link from the wayside station to the remote office. The space communication link may be radio or inductive. The line telephone link may be the usual public telephone system. In such an arrangement frequent railway wayside stations with an attendant at each station are required to enable a passenger on a train to telephone to a public telephone system subscriber from any point along the railway.

With this usual arrangement a conversation between a passenger and a party at a remote office initiated through a given wayside station along the trackway may be interrupted due to the train advancing out of the range of transmission for the space communication link with that station. Thus, a long conversation may be interrupted one or more times due to the train advancing out of transmission range with the wayside station through which the connection is first established and connection to the telephone line circuit must be re-established through another station and this operation repeated as the train advances with the result that there are several interruptions in the conversation.

Accordingly, a feature of my invention is the provision of novel and improved communication systems for vehicles.

Another feature of my invention is the provision of a communication system for vehicles incorporating improved repeater facilities to provide telephone communication between a passenger on a vehicle en route and a remote office and which repeater facilities require only a few attended wayside stations.

Again, a feature of my invention is the provision of a communication system for vehicles incorporating improved switching and repeater facilities to enable the connection between a vehicle and a public telephone subscriber to be established first through one wayside station and then re-established through a second wayside station as the vehicle advances without interruption of the conversation and which facilities insure that at no time will the communication energy fall below a required energy level.

Another feature of my invention is the provision of a communication system incorporating an improved repeater and control means to enable the attendant at each of two wayside stations, one at each side of a repeater station, to direct the transmission from the repeater station toward his respective wayside station, and to enable each attendant to lock out the other attendant from seizing control of the repeater station, an indication being provided at each wayside station showing when the lockout means is in effect.

Other features, objects and advantages of my invention will appear as the specification progresses.

The foregoing features, objects and advantages of my invention I attain by a novel and improved combination of space communication apparatus, line carrier telephone apparatus, repeater facilities and switching apparatus to interconnect the space communication apparatus on vehicles moving along the trackway wtih the subscribers of a public telephone system.

Preferably, terminal wayside stations are located one at each end of the stretch of trackway and repeater stations are spaced along the trackway at intervals somewhat less than double the effective range of the space communication equipment. For example, if the effective range of the space communication equipment is of the order of 30 to 35 miles, the wayside stations are located approximately 50 miles apart. Thus, for a trackway division having a length of the order of 200 miles there would be a terminal station at each end and three repeater stations. Certain ones of the repeater stations, which I shall term intermediate repeater stations, are arranged for each to cooperate with the nearest terminal station and other ones of the repater stations, which I shall call overlap repeater stations, are arranged to cooperate with the nearest terminal station in each direction. In the example recited above, the first one of the repeater stations would be an intermediate repeater station which cooperates with a first one, say, the west terminal station, a second one of the repeater stations would be an overlap repeater station which cooperates with the west terminal station and also with the other or east terminal station, and a third one of the repeater stations would be an intermediate repeater station cooperating with the east terminal station.

Each wayside station and each vehicle is equipped with space communication apparatus which affords telephone communication between a vehicle moving along the trackway and the wayside station in the vicinity of the vehicle, such wayside station being either to the rear or in advance of the vehicle. Since, as described hereinbefore, the wayside stations are spaced somewhat less than double the effective range of transmission of the space communication system, there is an overlap in which a vehicle can communicate with either the wayside station in advance or with the wayside station to the rear. That is, the track layout of the wayside stations according to my invention provides an overlap between stations for the space communication equipment.

The line carrier telephone equipment involves duplex carrier telephone apparatus at each wayside station and a line circuit which extends from each terminal station through the adjacent intermediate repeater stations to the overlap repeater station. The line carrier apparatus of each wayside station is connected to the line circuit for communication between the wayside stations, and at each repeater station the line carrier apparatus is adaptable of being coupled to the space communication apparatus at the same station. The line carrier telephone at each terminal station is connected to the line circuit and it is also adaptable of being connected to a public telephone line connection.

The terminal wayside stations are attended and each is provided with a telephone line connection which terminates at the switchboard of an exchange of an associated public telephone system. By switching means to be referred to, the attendant at each terminal station of my invention can arrange with the operator at the exchange of the public telephone system to connect any subscriber of the public telephone system and any toll line party with whom the public telephone system can connect, to the space communication apparatus or to the line carrier apparatus of that particular terminal station.

The switching apparatus includes line circuits for interconnecting the space communication apparatus and the line carrier apparatus of the different wayside stations and for connecting these apparatuses to the public telephone connections. The arrangement of these line circuits is such that an operator at a terminal station can selectively connect the space communication apparatus or the line carrier telephone apparatus of his own station to the public telephone line connection of his station. It also enables the operator at a terminal station to effectively couple the line carrier telephone apparatus of any one of the intermediate repeater stations cooperating with his terminal station or that at the overlap repeater station to the space communication apparatus of the respective repeater station. In this way an operator at a terminal station can set up telephone connections from any vehicle to a subscriber of the public system as long as the vehicle is between his terminal station and a distance beyond the overlap repeater station substantially equal to the effective range of the space communication equipment.

Since the two terminal stations have connections to an exchange of the public telephone system and both cooperate with the overlap repeater station, a connection set up between a vehicle and a subscriber of the public telephone system through the overlap repeater station and one of the terminal stations can be re-established through the overlap repeater station and the other terminal station and the switching means provides such transfer of connections without an interruption of the conversation. That is to say, there is an overlap territory adjacent the overlap repeater station during which the connection between a vehicle and a subscriber of the public telephone system can be established from either terminal station. Accordingly, a connection between a vehicle and a public telephone system subscriber first established through one of the terminal stations can be transferred to the other terminal station by the terminal station operators while the vehicle is moving through the overlap territory adjacent the overlap repeater station.

The switching apparatus also preferably includes lockout means wherewith an operator at either terminal station once having taken over the control of the overlap repeater station can prevent the operator at the other terminal station from controlling the overlap repeater except as the two operators prearrange.

I shall describe one form of apparatus embodying my invention and shall then point out the novel features thereof in claims.

Figure 1B:
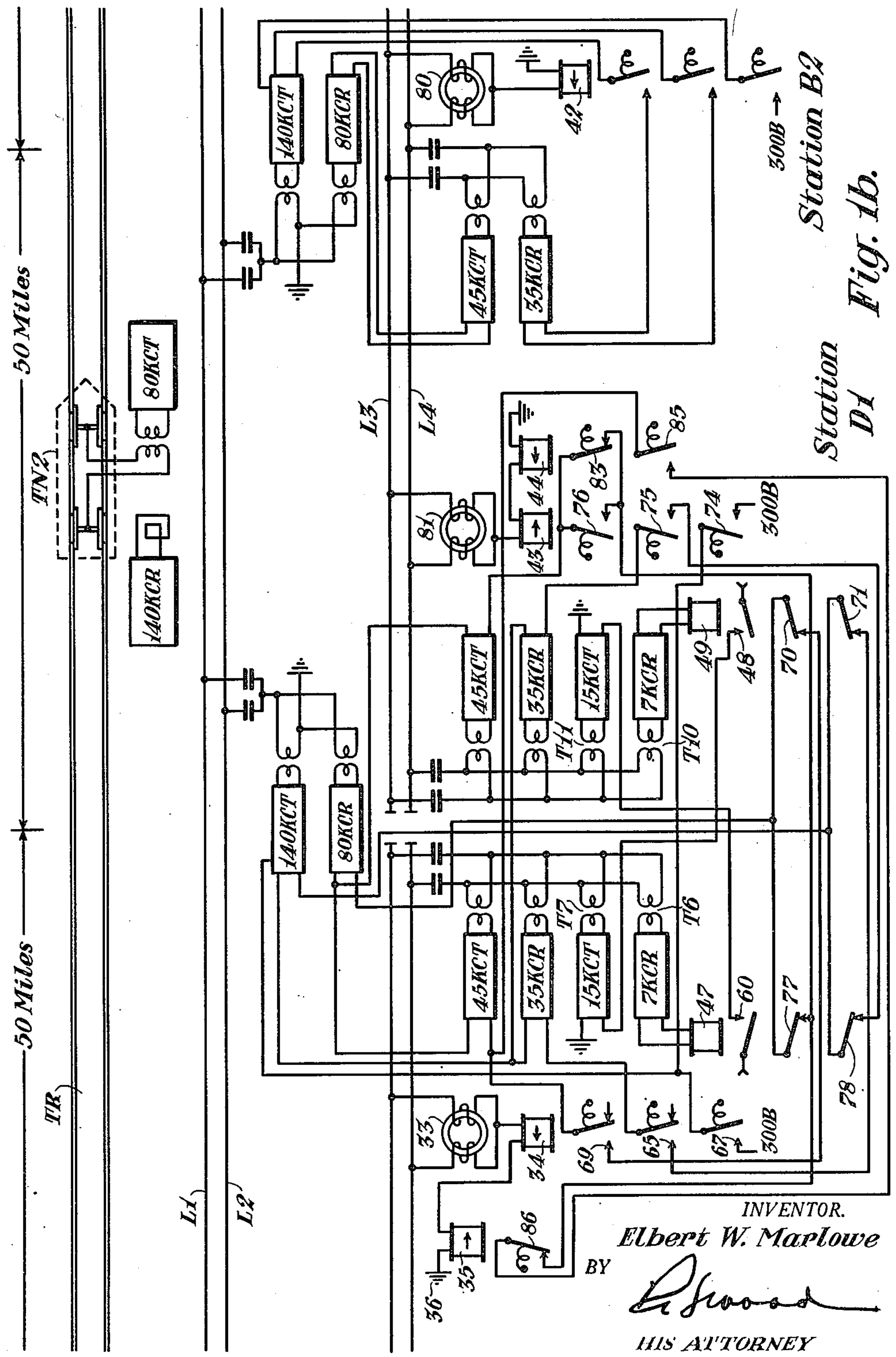
Figure 1C:
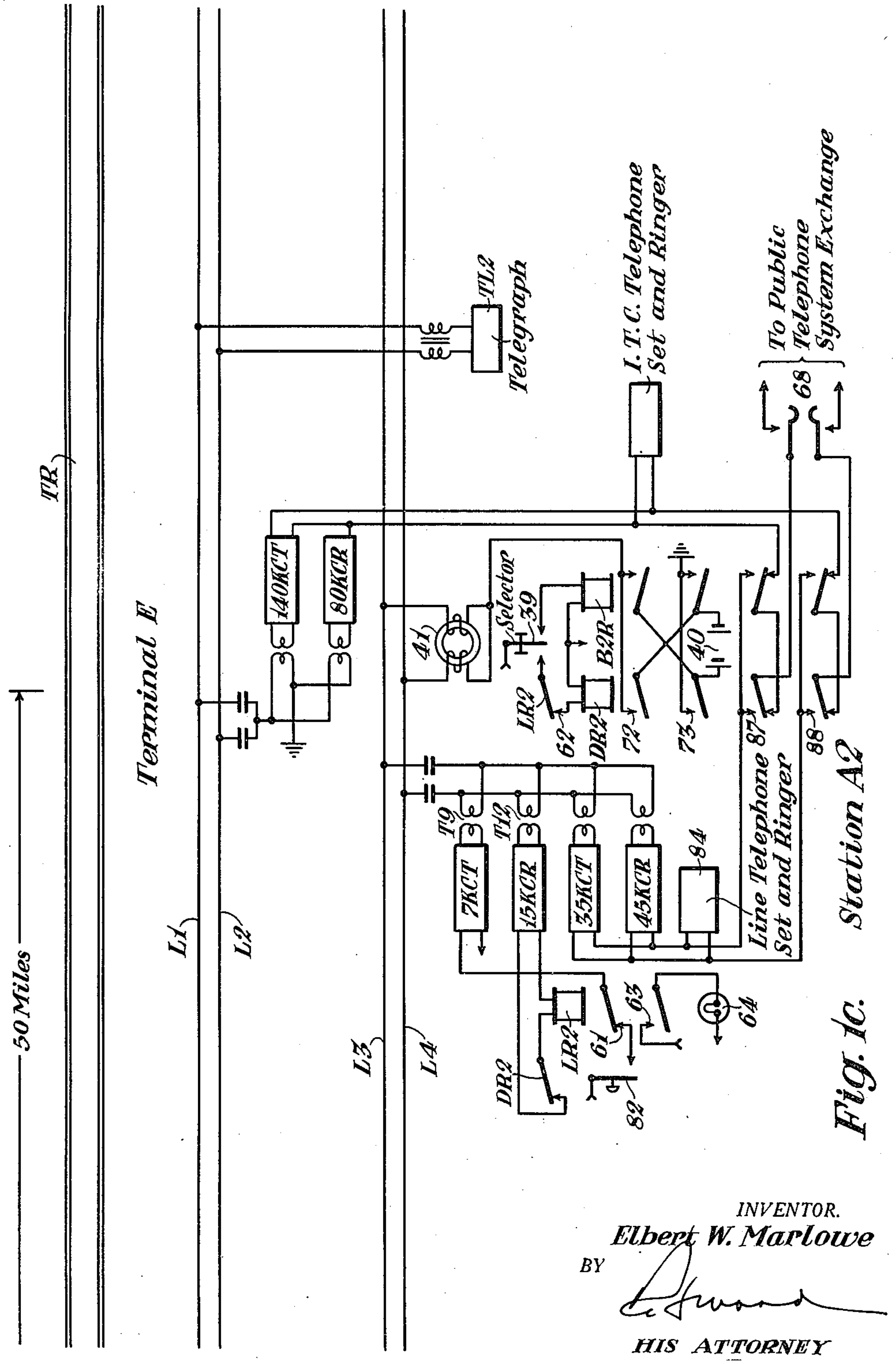

In the accompanying drawings, Figs. 1*a*, 1*b* and 1*c* when placed end to end with Fig. 1*a* at the left are diagrammatic views showing one form of equipment embodying my invention when used with a communication system for railway trains.

It is to be understood that my invention is not limited to communication systems for railway trains and this one embodiment illustrates the many places the equipment is useful.

Referring to the drawings, the reference character TR designates a stretch of railway track which is equipped with a train communication system of the type here involved. This track TR may be that of a single track line or it may be one track of a multiple track road. I shall consider the track TR as an eastbound track of a double track road extending between a west terminal W and an east terminal E, and which terminals are spaced apart a distance of the order of 200 miles but the distance between the terminals may vary according to the territory through which the railway runs, my invention not being limited to any specific length of track.

This stretch of railway is here provided with five communication system stations designated as stations A1, B1, D1, B2, and A2, and which stations are illustrated as spaced approximately 50 miles apart although a different number of stations and other spacings can be used. The stations A1 and A2 are terminal wayside stations located at the railway terminals W and E, respectively, and stations B1, D1, and B2 are repeater wayside stations, the stations B1 and B2 being intermediate repeater stations and the station D1 being an overlap repeater station.

Two eastbound trains moving over track TR are shown conventionally at TN1 and TN2, train TN1 being in the vicinity of the terminal station A1 and train TN2 being a short distance to the east of station D1.

Each of the wayside stations and each of the trains are provided with space communication equipment which may be of the radio type or of the inductive type, both such types of train communication equipment being known in the art. As here illustrated the space communication equipment is a duplex carrier inductive system, one carrier frequency being used for transmission from the wayside stations to the trains and a second and different carrier frequency being used for transmission from the trains to the wayside stations. As an aid in the understanding of the invention, I shall assume that a carrier of 140 kilocycles is used for sending from wayside stations to trains and a carrier of 80 kilocycles is used for sending from trains to the wayside stations.

Inductive carrier communication systems of the type here contemplated utilize a transmitting channel which is formed by the line wires paralleling the track, the track rails, the distributed inductance between the line wires and ground, and the distributed mutual inductance of the line wires and the track rails. The reference characters L1 and L2 designate a pair of line wires which extend along the track TR between the terminals W and E and which line wires are available for use in the transmitting channel of the carrier inductive communication system due to the longitudinal circuit formed by the line wires in multiple and their distributed impedance with ground. These line wires L1 and L2 may be existing wires used in a telegraph or similar circuit and which are strung on a pole line along the railway to bring the wires substantially parallel to and relatively close to the track so that the line wires are capable of effective inductive relationship with circuit elements mounted on a train. As shown in the drawings, telegraph equipments indicated conventionally by the reference characters TL1 and TL2 are located at the wayside stations A1 and A2, respectively, and connected to the line wires L1 and L2 for telegraph communication between these two terminal stations in the usual manner.

The space communication equipment provided for each train includes a transmitter and a receiver. For example, the train TN1 is provided with a transmitter and a receiver shown conventionally at 80KCT and 140KCR, respectively. The transmitter 80KCT is shown coupled to the transmitting channel through a loop circuit including a transformer T1, a primary winding 9 of which is connected to the output of the transmitter, and a secondary winding 10 of which transformer is connected to two pairs of spaced wheels of the train, and which loop circuit thus formed has an inductive relation with the transmitting channel including the line wires L1 and L2. The receiver 140KCR is connected to a pick-up coil 11 mounted on the train for inductive relation with the rails and line wires of the transmitting channel. The transmitter 80KCT and the receiver 140KCR may take different forms and they may be similar to the corresponding devices described in a copending application for Letters Patent of the United States of common ownership, Serial No. 575,311, filed January 30, 1945, now U. S. Patent No. 2,484,680, issued October 11, 1949, by Paul N. Bossart, for Railway train communication systems.

It is sufficient for this application to point out that the transmitter 80KCT is capable of supplying a carrier current of 80 kilocycles modulated by voice frequencies, frequency modulation being preferably used, and the receiver 140KCR is capable of demodulating and reproducing the voice frequencies of a carrier telephone current using a carrier of 140 kilocycles and frequency modulation.

The space communication equipment at each wayside station includes a receiver 80KCR and a transmitter 140KCT, and which devices are similar to the train carried devices except the station transmitter uses a carrier of 140 kilocycles to cooperate with the train receiver using 140 kilocycles, and each station receiver uses a carrier of 80 kilocycles to cooperate with the train transmitter using a carrier of 80 kilocycles. In this way the wayside apparatus and the train carried apparatus provide duplex operation. These wayside station devices for the space communication equipment are coupled to the transmitting channel by being coupled to the line wires L1 and L2 in multiple. For example, at the terminal station A1, an output transformer T2 has its primary winding 12 connected to the output of the transmitter 140KCT, and a secondary winding 13 coupled to the line wires L1 and L2 in multiple by having one terminal connected to the junction terminal of two capacitors 14 and 15 connected in series across the line wires L1 and L2, and its other terminal connected to a ground electrode 16. An input transformer T3 has its primary winding 17 coupled to the line wires L1 and L2 in multiple with the secondary winding 13 of transformer T2, while a secondary winding 18 of the transformer T3 is connected to the input of the receiver 80KCR.

Thus when the train TN1 is within the range of station A1, carrier telephone current supplied by transmitter 80KCT on the train is transmitted through the transmitting channel including the line wires L1 and L2 and applied to receiver 80KCR at station A1 and a corresponding voice telephone current appears on the lead wires 19 and 20 connected to the output of the receiver. Also, a voice frequency current applied through wires 19 and 20 to the input of the station transmitter 140KCT when that transmitter is made active in a manner to appear shortly is converted to a carrier telephone current of 140 kilocycles and transmitted to the vehicle through the transmitting channel and picked up by coil 11 and applied to the receiver 140KCR and the corresponding voice frequency energy is reproduced in the output of that receiver.

It is to be observed that the receivers of the space communication equipment are all normally active, that is, each receiver is active during non-communication periods ready to receive a message. The transmitters, however, are normally inactive but are conditioned so as to become immediately active when energy is applied thereto from a proper source. For example, the transmitter 140KCT at the terminal station A1 immediately becomes active when energy from a source having a terminal 300B is applied thereto by the closing of a manually operable switch 21 and back contacts 91 and 92 of relays B1R and DR1 to be referred to later.

The line carrier telephone equipment comprises a carrier telephone transmitter and a carrier telephone receiver at each wayside station together with a line circuit between the stations. For example, a pair of line wires L3 and L4 extend between the west terminal station A1 and overlap station D1 and also between the east terminal station A2 and station D1. At station D1 these line wires are preferably dead-ended although they may be connected by filters to permit their use in other circuits if desired. The line carrier telephone transmitters and receivers at the wayside stations may be of any one of several forms which will enable duplex operation between each terminal station and the cooperating repeater stations. Looking at station A1, the line carrier telephone equipment includes a transmitter and a receiver shown conventionally at 35KCT and 45KCR, respectively, the transmitter using a carrier of 35 kilocycles and the receiver using a carrier of 45 kilocycles. The output of the transmitter 35KCT and the input of the receiver 45KCR at station A1 are connected in multiple across the line wires L3 and L4 through an output transformer T4 and an input transformer T5, respectively, as will be apparent by an inspection of the drawing, blocking capacitors 22 and 23 being preferably interposed in the connection.

At the terminal station A2 the line carrier telephone transmitter and receiver are the same as at station A1. At the repeater stations B1, D1 and B2, the line carrier telephone equipment includes a transmitter 45KCT and a receiver 35KCR similar to those of the terminal stations except the transmitter uses a 45 kilocycle carrier to cooperate with the terminal station 45KCR receiver and the receiver uses a 35 kilocycle carrier to cooperate with the terminal station transmitter 35KCT.

At the overlap repeater station D1, the line carrier telephone equipment preferably includes a transmitter and a receiver associated with the line wires L3 and L4 extending west to the terminal station A1 and also a receiver and a transmitter that cooperate with the line wires L3 and L2 extending east to the terminal station A2.

At each of the terminal stations A1 and A2 the line carrier telephone equipment is adaptable of being connected to a line telephone connection of a public telephone system through the switching apparatus and that at each repeater station is adaptable of being coupled to the space communication equipment through connections under the control of the operators at the terminal stations by the switching apparatus as will now be described.

At station A1, a jack type connection 51 leads to an exchange office of an associated public telephone system and thus an operator at the exchange office can arrange to connect any subscriber or toll line party to the connection 51 of station A1 of the train communication system. Similarly, a jack connection 68 at station A2 leads to an exchange office of the public telephone system for connection to the subscribers of the public telephone system.

The switching apparatus involves two line control circuits extending from each terminal station to the repeater stations, these line control circuits using the line wires L3 and L4, although other line wires may be used. Each terminal station operator has charge of setting up the telephone connections between trains and subscribers of the public telephone system by use of the switching apparatus. Each operator arranges the connection individually when the train is within the vicinity of his terminal station or a cooperating intermediate repeater station. The overlap repeater station is under the control of both operators to enable a connection between a train and a telephone subscriber to be switched from one terminal station to the other terminal station by a joint action of the two operators.

Considering first the terminal station A1, a first line control circuit extending therefrom to the repeater stations is of the polarized type and loops through the repeater stations in multiple. This first line control circuit from station A1 is controlled by a selector key 24 which is manually operable from a center position to either a left-hand or a right-hand position and when operated to the left-hand position it completes a simple circuit for energizing a control relay B1R and that relay is picked up. With relay B1R picked up the line circuit is completed for energizing control relays at stations B1 and D1 by energy supplied from a battery 25 at station A1 and which line circuit can be traced from battery 25 through front contact 26 of relay B1R, a simplex coil 27 to the two line wires L3 and L4 in multiple, the two line wires, a simplex coil 28 at station B1, winding of a control relay 29 to ground electrode 30, ground path and ground electrode 31 to the other terminal of battery 25 through front contact 32 of relay B1R. At station D1 this circuit is completed through simplex coil 33, the windings in series of two relays 34 and 35 and ground electrode 36. With the selector 24 moved to the right-hand position, a simple circuit is completed for relay DR1 and that relay is picked up closing front contacts 37 and 38 to pole change the connection of battery 25 to the line wires L3 and L4. The control relays 29, 34, and 35 at the repeater stations are of the bias polar type, the contacts of which are operated by a bias element to a preselected position and also operated to this position when the relay is energized at one polarity and the contacts are operated to the other position against the bias when the relay is energized at the reverse polarity. The arrangement is such that when relay B1R is picked up current of what I shall call positive polarity is supplied from battery 25 to the line circuit and the relays 29 and 35 are energized as required to shift their contacts to the right-hand position but the relay 34 is energized to hold its contacts in its biased right-hand position. When relay DR1 is energized, the line circuit current is of negative polarity and the relays 29 and 35 are energized as required to retain their contacts at the bias left-hand position but relay 34 is energized to shift its contacts to the left-hand position.

Similarly, a polarized line control circuit extends from terminal station A2 to the stations B2 and D1, the circuit involving a selector key 39, a battery 40 and control relays DR2 and B2R at the terminal station A2, line wires L3 and L4, simplex coils 41, 80, and 81 and control relays 42, 43, and 44 at the repeater stations B2 and D1. The arrangement is such that when selector key 39 is shifted to the right to pick up relay B2R by a simple circuit, battery 40 is connected to the line circuit at a polarity as required to energize relays 42 and 44 to shift their positions and to retain relay 43 in its bias position, and when selector 39 is shifted to the left-hand position to energize relay DR2 the battery 40 is connected to the line at a polarity as required to shift the relay 43 to its right-hand position and to retain the control relays 42 and 44 at their biased right-hand positions.

The second control line circuit extending from each terminal station includes the line wires L3 and L4 in a series or transverse circuit and sources of different carrier frequency currents. Again, looking at terminal station A1, the closing of a manually operable key 45 completes a simple circuit for applying power to an oscillator 7KCT, the connection also including a back contact 46 of a lock relay LR1 to be referred to later. The oscillator 7KCT may be of any standard form such as an electron tube oscillator and it is adaptable of supplying a given carrier current which I shall assume is of a frequency of 7 kilocycles. The output of the oscillator is connected to the line wires L3 and L4 through a transformer T13 and capacitors 22 and 23. At station D1 a first or west receiver indicated conventionally at 7KCR is responsive to a carrier frequency of 7 kilocycles and it has its input connected across the line wires L3 and L4 through a transformer T6 and its output connected to a control relay 47. Thus the relay 47 is energized and picked up in response to the oscillator 7KCT being activated by the closing of the switch 45. This second control line circuit for station A1 also includes a west oscillator 15KCT at station D1 and a receiver 15KCR and relay LR1 at terminal station A1. The west oscillator 15KCT is of a standard form adaptable of supplying a carrier which I shall assume has a frequency of 15 kilocycles when its input is supplied with power by a connection which includes front contact 48 of a relay 49. The output of the transmitter 15KCT is connected to line wires L3 and L4 to the west of station D1 through transformer T7. The receiver 15KCR at station A1 is responsive to a carrier of a frequency of 15 kilocycles and is connected across the line wires L3 and L4 through a transformer T8 and has its output connected to the relay LR1 through back contact 89 of relay DR1 so that relay LR1 is energized in response to energy supplied by the west transmitter 15KCT of the station D1 providing the relay DR1 has not been picked up.

Similarly, a second control line circuit including the line wires L3 and L4 in series extends from a terminal station A2 to the repeater station D1. An oscillator shown conventionally at 7KCT at station A2 is controlled through a manually operable key 82 and back contact 61 of a lock relay LR2 for supplying energy to the line wires through a transformer T9 for energizing a second or east receiver 7KCR located at station D1 and connected through a transformer T10 to the line wires L3 and L4 to the east of station D1, a relay 49 being energized by this 7KCR receiver. Also a second oscillator 15KCT at station D1 supplies a carrier of 15 kilocycles across line wires L3 and L4 to the east of station D1 through a transformer T11, and this control current energizes a receiver 15KCR at station A2 through transformer T12 to in turn control relay LR2, relay LR2 being a lock relay for the station A2. The second oscillator 15KCT at station D1 is activated through a connection including front contact 60 of relay 47.

In describing the operation of the apparatus I shall assume that the apparatus is at its normal condition, that is, the condition during noncommunication periods, and in which condition it is illustrated in the drawings. I shall next assume a passenger on the train TN1 places a call for a subscriber on the public telephone system. At the outset the passenger or an operator on the train acting for the passenger conditions the train transmitter 80KCT to send out its given calling signal, which may be the carrier modulated by a tone frequency of, say, 1000 cycles per second interrupted at the frequency of 20 times per second. The carrier of the transmitter 80KCT modulated by the calling signal is supplied to the transmitting channel including line wires L1 and L2 and energy is picked up by the receiver 80KCR at station A1, the train TN1 being within the effective transmission range of that station. After demodulation at receiver 80KCR the signal is applied through wires 19 and 20 to the ringer of the telephone set 50. The station A1 operator answers the call by closing switch 21 to energize the inductive carrier transmitter 140KCT and then sending an agreed salutation to the train through the set 50 and the transmitter 140KCT. This carrier telephone current is picked up by the train receiver 140KCR and the current demodulated and the answering call reproduced on the train. The train operator then places the passenger's call with the station operator, who in turn then plugs in at the connection 51 to call the operator at the exchange of the public telephone system, who in turn will make the connection with the subscriber being called in the usual manner. When this has been done, station A1 operator will tell the passenger on the train that his party is ready. It is to be observed that the public telephone system connection 51 is connected to the input of transmitter 140KCT and to the output of the 80KCR receiver of the inductive carrier equipment through back contacts of the two control relays B1R and DR1, back contacts 53 and 54 being interposed in one side of the circuit connection and back contacts 55 and 56 being interposed in the other side of the connection.

From this point on the voice frequency telephone current from the public telephone system is applied to the transmitter 140KCT and the resultant modulated carrier telephone current transmitted to the train through the transmitting channel of the space communication system. The current is picked up and demodulated at receiver 140KCR on the train and the voice frequencies of the conversation are reproduced by the associated loud-speaker or other telephone receiving device. The return portion of the conversation is applied to the train transmitter 80KCT and the modulated carrier telephone current is transmitted to station A1 through the transmitting channel and is applied to the receiver 80KCR where it is demodulated and the voice frequency telephone current is applied to the line leading to the public telephone system through the connection 51. If necessary the station A1 operator can monitor the communication through his set 50 in the usual manner.

If the conversation lasts for some little time and the train TN1 in moving east is getting out of the range of station A1 and into the range of the repeater station B1, the operator at station A1 will shift the connections to the repeater station B1. To do this, the operator at station A1 shifts his selector switch 24 to the left to pick up the control relay B1R which connects battery 25 to the line circuit to energize relay 29 to close its contacts 57, 58, and 59 and thereby energize transmitter 140KCT and couple the carrier telephone receiver 35KCR at station B1 to the inductive carrier transmitter 140KCT, the carrier telephone transmitter 45KCT being permanently coupled to the inductive carrier receiver 80KCR. With the relay B1R picked up, the inductive carrier equipment at station A1 is disconnected from the public telephone connection 51 at the back contacts 53 and 55 of relay B1R, and the line carrier receiver 45KCR and transmitter 35KCT are connected to the public telephone system connection 51 through front contacts 53 and 55 of relay B1R. Also transmitter 140KCT at station A1 is deenergized due to the opening of back contact 91 of relay B1R. Furthermore, the relay 35 at station D1 is also operated by the line circuit but the operation of this relay at this time performs no useful purpose.

From this point on the voice frequency energy from the public telephone system is supplied to the transmitter 35KCT at station A1 and a modulated carrier telephone current is transmitted to station B1 through the line circuit including line wires L3 and L4. At station B1 the current is applied to the receiver 35KCR to be demodulated and the voice frequency energy is applied to the inductive carrier transmitter 140KCT of station B1 and the modulated carrier current is transmitted to the train through the transmitting channel of the inductive carrier system to be picked up and demodulated at the train receiver 140KCR. The return portion of the conversation is sent out from the train transmitter 80KCT to be picked up by the receiver 80KCR at station B1 and the voice frequency energy of the output of this receiver is applied to the line carrier transmitter 45KCT and this carrier telephone current is transmitted to the station A1 over the line circuit including the line wires L3 and L4 and applied to the receiver 45KCR at station A1 to be demodulated and the corresponding voice frequency current is supplied through the connection 51 to the public telephone system. The station A1 can now monitor the communication through his set 78.

Assuming that the conversation still continues while the train TN1 moves east so that it is getting out of the range of station B1, that is, it is in the overlap between stations B1 and D1. The operator at station A1 will shift the connection from repeater station B1 to station D1. In doing this the operator at station A1 will first close the key 45 to sieze control of repeater station D1 and put the lockout means into effect. With key 45 closed the oscillator 7KCT at station A1 is energized and the 7 kilocycle carrier is applied to the line circuit L3—L4 to energize the west receiver 7KCR at station D1 and in turn energize the relay 47 in that station. With relay 47 picked up closing front contact 60 power is applied to the east carrier oscillator 15KCT at station D1 and the 15 kilocycle carrier is applied to the line wires L3 and L4 east of station D1 to energize the receiver 15KCR at station A2 and in turn picked up the lockout relay LR2. Relay LR2 on picking up opening back contacts 61 and 62 prevents the operator at station A2 from controlling the station D1 as will shortly appear. Also the closing of front contact 63 of relay LR2 completes an obvious circuit for an indicator lamp 64 and the lamp is illuminated to indicate to the operator at station A2 that the operator at station A1 has taken control of the repeater station D1.

The operator at station A1 then operates his selector key 24 to the right-hand position to pick up the relay DR1 and release relay B1R. This operation of these relays pole changes the connection of battery 25 to the line circuit and the relays 29 and 35 of the repeater stations are restored to their left-hand positions and the relay 34 at station D1 is operated to its left-hand position closing contacts 65, 67, and 69. Also, the telephone connection 51 is now connected to the line carrier transmitter 35KCT and receiver 45KCR over front contacts 54 and 56 of relay DR1. The closing of contact 67 of relay 34 applies power to the transmitter 140KCT of station D1, and the closing of contacts 65 and 69 couples the west line carrier transmitter 45KCT and receiver 35KCR of station D1 to the inductive carrier equipment. The connection of the input of west transmitter 45KCT extends from its upper input terminal through the output of the 80KCR receiver, back contact 70 of relay 49, and contact 69 of relay 34 to the lower input of west transmitter 45KCT; and the connection of the west receiver 35KCR extends from its upper output terminal through the input of the inductive carrier transmitter 140KCT, back contact 71 of relay 49 and contact 65 of relay 34 to the lower output terminal of west receiver 35KCR.

Voice frequency telephone current received through the connection 51 of the telephone system is applied to transmitter 35KCT at station A1 and the line carrier telephone current is sent out on the line wires L3 and L4 to station D1 where it is received and demodulated by the west receiver 35KCR and the voice frequency energy is supplied to the input of the inductive carrier transmitter 140KCT of station D1. The resulting carrier telephone current is then transmitted to the train and picked up by the receiver 140KCR and demodulated and reproduced. The return portion of the conversation sent out from the train transmitter 80KCT is now picked up by the inductive carrier receiver 80KCR at station D1 where it is demodulated and the voice frequency current applied to the west transmitter 45KCT and the line carrier telephone current is sent to the station A1 over the line circuit L3—L4 to be received and demodulated at the receiver 45KCR at station A1 and the corresponding voice frequency telephone current is supplied to the public telephone system through the connection 51.

Assuming that the conversation is long and continues as the train TN1 moves east toward station D1, the telephone connection will be transferred from the terminal station A1 to the terminal station A2 while the train is in the range of station D1. In making this transfer, the two operators at stations A1 and A2 communicate with each other, say by the telegraph sets TL1 and TL2 regarding the transfer and the operator at station A2 will get in touch with the operator of an exchange of the public telephone system for the exchange operator to connect the subscriber to the connection 68 at station A2 in multiple with the connection made at connection 51 of station A1. The operator at station A2 in preparation for this transfer will operate his selector key 39 to the left and close his lock key 82. Since lock relay LR2 is picked up opening back contacts 61 and 62, this operation of keys 39 and 82 causes no immediate response at station A2. The station A2 operator then informs the operator at station A1 that he is ready for the transfer to be made.

The operator at station A1 then when he is ready opens his lock key 45 and the transfer of the connections immediately follows automatically. With key 45 opened power is removed from transmitter 7KCT and relay 47 at station D1 is deenergized and released. The opening of front contact 60 of relay 47 removes power from the east transmitter 15KCT at station D1 and the lock relay LR2 at station A2 is deenergized and released closing back contacts 61 and 62. The closing of back contact 62 is followed by the picking up of relay DR2 closing front contacts 72 and 73 to connect battery 40 to the line circuit at the polarity required to cause relay 43 at station D1 to shift its contacts 74, 75, and 76 to their right-hand positions. The closing of contact 74 completes an additional path for supplying power to the inductive carrier transmitter 140KCT at station D1, and the closing of contacts 75 and 76 completes paths for coupling the east line carrier transmitter 45KCT and receiver 35KCT to the inductive carrier receiver 80KCR and transmitter 140KCT, respectively, since back contacts 77 and 78 of relay 47 are now closed. At the same time the closing of back contact 61 of relay LR2 applies power to the 7KCT transmitter at station A2 and relay 49 at station D1 is energized and picked up opening back contacts 70 and 71 to disconnect the west line carrier transmitter 45KCT and receiver 35KCR from the inductive carrier receiver 80KCR and transmitter 140KCT at station D1. This completes the transfer of the connection from the train TN1 to the subscriber of the telephone system. It is to be noted that when lock relay LR2 at station A2 was released the lamp 64 was extinguished to indicate to the operator that the transfer had been made.

Thus the voice frequency telephone current from the public telephone system is now received through connection 68 at station A2 and applied to the transmitter 35KCT over front contacts 87 and 88 of relay DR2 and the carrier telephone current is sent out over the line circuit to station D1 when it is received at east receiver 35KCR and the voice frequencies are in turn applied to the inductive carrier transmitter 140KCT to be transmitted to the train. The return carrier current sent from the 80 KCT transmitter on the train is picked up at the 80KCR receiver at station D1 and demodulated and the voice frequencies applied to the east line carrier transmitter 45KCT to be sent to station A2 over the line circuit where the current is received and demodulated at receiver 45KCR and the voice frequency current is supplied to the public telephone circuit through the connection 68.

When relay 49 at station D1 is energized in response to the transfer of the connections, the closing of front contact 48 applies power to the west transmitter 15KCT and the corresponding carrier current is supplied over the line control circuit to the 15KCR receiver at station A1 and the lock relay LR1 is energized and picked up opening back contacts 66 and 89 to prevent the operator at station A1 from control of station D1, the lockout being indicated by the lamp 90 at station A1. When the lamp 90 is illuminated to indicate that the transfer of the connection is completed the operator at station A1 would restore his selector key 24 to its center position and restore the control relay 34 at station D1.

If the conversation continues as the train moves east toward the terminal station A2, the operator in station A2 can transfer the connection from the line carrier apparatus at station D1 to that at the intermediate repeater station B2 and then later to the inductive carrier apparatus of his own station A2 in substantially the same manner as the operator at station A1 makes the transfer of the connection from station A1 to the repeater station B1 and then to the station D1, except that the operation of the transfer is in the reverse order.

In the event train TN1 is in the vicinity of the repeater station B1 when the passenger places a call, the call sent out from the train through its transmitter 80KCT will be picked up at the receiver 80KCR at station B1 and demodulated and the call signal applied to the line carrier transmitter 45KCT at station B1 which is normally active so that the resultant call will be transferred to station A1 through the line circuit to be received at the receiver 45KCR at station A1 and the call signal sounded at the set 79. The operator at station A1 using his set 79 will answer the call and place the call through the exchange of the public telephone system and thereafter arrange for the connection substantially in the same manner as explained hereinbefore.

In the case a passenger on the train TN2 which is near station D1 places a call, the call will normally be directed from station D1 to the east terminal station A2 due to a special connection provided at the station D1. The output of the receiver 80KCR at the station D1 is provided with an alternative connection which includes the input of the east line carrier transmitter 45KCT, a normally closed contact 83 of relay 44 and back contact 77 of relay 47. Thus the call from train TN2 will go from station D1 to the east terminal station A2 to be received at receiver 45KCR of that station and the call sounded in the ringer of the line telephone set 84 of station A2.

In the event the train TN2 advances east and its conversation is still being carried on through the repeater station B2 and the train TN1 has advanced east to be near station D1 and the passenger on the train TN1 places a call, the call from train TN1 will now be directed to the west terminal station A1 because the line circuit to the east station A2 is already in use. This is so because the operator at station A2 in setting up the connection at station B2 for the train TN2 also operated the relay 44 at station D1 to open its contact 83 and close contact 85, and the output of the inductive carrier receiver 80KCR at station D1 is switched from the input of the east transmitter 45KCT to the input of the west transmitter 45KCR at station D1, the latter connection including a normally closed contact 86 of relay 35. These two relays 35 and 44 permit the two operators at stations A1 and A2 to direct the connections of a train in the overlap territory at station D1 toward either of the two terminal stations but not toward both stations at the same time.

It is obvious that the two intermediate repeater stations B1 and B2 may be omitted and only the overlap repeater station D1 provided when the stretch of railway involved is of the length only a little greater than twice the effective range of transmission of the space telephone equipment.

It will be apparent from an inspection of the drawings taken in connection with the foregoing description of the operation of the apparatus for trains moving east that the apparatus will function in a similar manner for providing connections between a passenger on a train and a public telephone subscriber when the train is moving west over the west bound track or even when moving west over track TR.

Although I have herein shown and described but one form of communication system for vehicles embodying my invention it is understood that various changes and modifications may be made therein within the scope of the appended claims without departing from the spirit and scope of my invention.

Having thus described my invention, what I claim is:

1. In a communication system for telephoning between a passenger on a vehicle moving between two terminal stations of its trackway and a party having access to a bidirectional line telephone system by space carrier telephone equipments when the distance between said terminal stations is relatively great compared with the effective range of transmission of such space carrier telephone equipments, a repeater station located along the trackway approximately midway between said terminal stations; said terminal stations, vehicle and repeater station each provided with said space carrier telephone equipment; a connection of said line telephone system at each said terminal station; switching means including a selector at each terminal station, a pair of control relays at said repeater station and a line circuit between said terminal stations and said repeater station for control of said relays by said selectors; and means governed by said selectors and relays to either selectively place the space carrier telephone equipment of a given one of the terminal stations or that of said repeater station in communication relationship with the line telephone system connection of said given terminal station or to selectively place the space carrier telephone equipment of the other terminal station or that of said repeater station in communication relationship with the line telephone system connection of said other terminal station.

2. In a communication system for telephoning between a passenger on a vehicle moving between two terminal stations of its trackway and a party having access to a bidirectional line telephone system by a space carrier telephone equipment when the distance between said terminal stations is over twice the effective range of transmission of said space telephone equipment, a repeater station located along the trackway between said terminal stations to form an overlap between the repeater station and each terminal station for said space telephone equipment; said terminal stations, vehicle and repeater station each provided with said space telephone equipment; a connection of said line telephone system at each said terminal station, switching means for each said terminal station, each said switching means including a manually operable selector at the terminal station and a control relay at the repeater station, means controlled by each said switching means to selectively connect either the space telephone equipment at the respective terminal station or that at said repeater station to the line telephone system connection at the same terminal station to enable an operator at either station to establish communication between a passenger of said vehicle and a party connected to the line telephone system when the vehicle is between his terminal station and the repeater station, and other communication means including a line circuit extending between the terminal stations and relays at the stations to enable the operators to cooperate in transferring the connection established between the passenger and said party from one terminal station to the other terminal station when the vehicle is in said overlap with no interruption in the conversation.

3. In a communication system for telephoning between a passenger on a vehicle moving over a given stretch of a trackway and a party off the trackway when said stretch is of a length greater than twice a given range of transmission, two terminal wayside stations one at each end of said stretch, a repeater wayside station located approximately midway between said terminal stations, space carrier telephone equipment at each of said wayside stations and on said vehicle and operative for effective communication between said vehicle and a wayside station when the vehicle is within said given range of transmission of the respective wayside station, line circuit means extending between said terminal stations and said repeater station, each said terminal station provided with a telephone connection through each of which connections a party off the trackway can be reached, switching means including a manually operable selector at each of said terminal stations and control relays at said repeater station, and said switching means having connections to said line circuit means to enable an operator at each of the terminal stations to couple either said carrier telephone equipment of his terminal station or that at said repeater station to said telephone connection of his terminal station.

4. In a communication system for telephoning between a passenger on a vehicle moving over a given stretch of a trackway and a party off the trackway when said stretch is of a length greater than twice a given range of transmission, two terminal wayside stations one at each end of said stretch, a repeater wayside station located approximately midway between said terminal stations, space carrier telephone equipment at each of said wayside stations and on said vehicle and operative for effective communication between said vehicle and a wayside station when the vehicle is within said given range of transmission of the respective wayside station, a public telephone system connection at each of said terminal stations; switching means including a source of power and a selector at each terminal station, control relays at said repeater station and line wires extending between the terminal stations and the repeater station; and means including contacts of said selectors and contacts of said control relays to enable an operator at each of the terminal stations to selectively connect the space carrier telephone equipment of his terminal station or that of the repeater station to the public telephone system connection of his terminal station.

5. In a system for telephone communication between a passenger on a vehicle moving over a given stretch of its trackway and a party off the trackway by space telephone equipment when said stretch is of a length relatively great compared with the effective range of transmission of said space telephone equipment, two terminal wayside stations one at each end of said stretch and each provided with a telephone connection through which a party off the trackway may be reached, a plurality of repeater wayside stations located along the stretch and spaced so that the distance between any two adjacent wayside stations is less than twice the effective transmission range of said space telephone equipment, space telephone equipment on said vehicle and one at each of said terminal and repeater stations, switching means for each of said terminal stations; each said switching means including a multiple position selector and a current source at the respective terminal station and a control relay at each repeater station counting from the respective terminal station up to and including a given overlap station of said repeater stations; means controlled by said selector and relays of each said switching means to enable an operator for the respective terminal station to connect either the space telephone equipment of the respective terminal station or that at any one of the repeater stations provided with a control relay of that switching means in communication relationship with said telephone connection of the respective terminal station, and other switching means located partly at each said terminal station and including other relays at said overlap repeater station to enable the operators for the two terminal stations to cooperative in determining to which of the terminal stations telephone connections the space telephone equipment of said overlap repeater station is to be connected.

6. In a system for telephone communication between a passenger on a train moving over a given stretch of railway and a party off the railway when said stretch is of a length greater than twice a given range of transmission, two terminal wayside stations one at each end of said stretch and each provided with a telephone connection to enable telephoning from the terminal station to a party off the railway, an overlap wayside station located approximately midway between said terminal stations, a space carrier telephone equipment at each of said wayside stations and on said train and capable of effective communication between a train and a wayside station when the train is within said given range of transmission of the respective wayside station, a line circuit extending between each said terminal station and said overlap station, switching means including a control current source and a manually operable selector at each said terminal station and control relays responsive to said control current at said overlap station, and said switching means having connections to said line circuits to enable an operator at each said terminal station to couple either the space carrier telephone equipment of his terminal station or that at said overlap station to said telephone connection of his terminal station, lockout means including a carrier current source and a lockout key at each terminal station and other control relays at said overlap station one for each terminal station, said lockout means connected to said line circuits to enable the operator at each terminal station to control the respective other control relay, and means governed by each said other control relay when operated to prevent the operator of the opposing terminal station from controlling the space carrier telephone equipment of the overlap station.

7. In a system for telephoning between a passenger on a train moving between two wayside terminal stations and a party off the railway through inductive carrier telephone equipments located one on the train and one at each of said terminal stations and which equipments have a given normal range of transmission along the railway, a stretch of railway greater in length than twice said given normal range of transmission, a terminal station at each end of the stretch, an overlap repeater station along the railway substantially midway between the terminal stations, an inductive carrier telephone equipment located at said overlap station, a public telephone system connection at each said terminal station capable of connections to parties off said railway; a switching means for each said terminal station including a control current source and a manually operable selector at the terminal station, a control relay at the repeater station and a line circuit between the terminal and repeater stations; means governed by each switching means to selectively couple the inductive carrier equipments of the respective terminal station and of the repeater station to the public telephone system connection of the respective terminal station, and other communicating means between said terminal stations to enable the operators of the terminal stations to cooperate in the control of said overlap station to maintain without interruption telephone connection between a passenger of the train and a party off the railway throughout the entire stretch.

8. In a train communication system using an inductive carrier telephone equipment for telephoning between trains and wayside stations for a given range of transmission, the combination comprising, a stretch of railway having a length greater than twice said given range, a terminal station located at each end of said stretch and an overlap repeater station at substantially the mid point of the stretch, each said station provided with said inductive carrier telephone equipment to telephone to trains when within said given range of the station, each said terminal station provided with a telephone system connection, a pair of line wires extending between each said terminal station and said overlap station, each said terminal and overlap station provided with line carrier telephone apparatus connected to said line wires for transmission between the stations, manually operable switching means at each terminal station to selectively connect the inductive carrier telephone equipment or the line carrier telephone apparatus of the same station to said telephone system connection of the station, and other switching means including a current source and a manually operable device at each terminal station and control relays at said overlap station connected to said line wires to enable an operator at either terminal station to couple the inductive carrier telephone equipment of the overlap station to the line carrier telephone apparatus of the overlap station and to direct transmission from the overlap station line carrier telephone apparatus toward his respective terminal station.

9. In a train telephone system using train carried telephone equipment having elements inductively coupled to a longitudinal line circuit extending along the railway, the combination comprising, two terminal wayside stations located at spaced points along the railway and each provided with public telephone line circuit connection, another line circuit including a pair of line wires extending between said terminal stations; a first, a second and a third repeater wayside station spaced along said railway between said terminal stations; each said terminal and repeater station provided with train telephone equipment coupled to said longitudinal line circuit for communication with a train when within the vicinity of the respective station, each said terminal and repeater station provided with carrier telephone equipment having connections across said pair of line wires, manually operable switching means at each said terminal station to selectively connect either the train telephone equipment or the carrier telephone equipment of the same station to said public telephone line circuit connection of the same terminal station, other manually operable switching devices located partly at said repeater stations and connected by said pair of line wires in multiple and ground for an operator at each terminal station to effectively cople the carrier telephone equipment of the adjacent and second repeater stations to the train telephone equipment of the respective repeater station, and additional switching means including relays located partly at said terminal stations and at said second repeater station and a manually operable key at each terminal station and connected by said pair of line wires arranged as a transverse circuit for the operator of either terminal station to lock out the operator of the other terminal station from coupling the carrier telephone equipment of the second repeater station to the train telephone equipment of that repeater station.

10. In a communication system for telephoning between a passenger on a vehicle moving between two terminal stations of its trackway and a subscriber of a public telephone system by space carrier telephone equipments when the distance between said terminal stations is relatively great compared with the effective range of transmission of such space telephone equipments, a repeater station located along the trackway between said terminal stations; said terminal stations, vehicle and repeater station each provided with said space carrier telephone equipment; a public telephone connection at each said terminal station through which an operator at the terminal station can make connection with subscribers of the public telephone system, switching means including a manually operable selector at each terminal station and control relays at said repeater station there being one relay for each selector, means governed by each selector and its respective control relay to selectively connect the space telephone equipment of the respective terminal station or that at the repeater station in communication relationship with the public telephone system connection of the respective terminal station for communication between a vehicle passenger and a public telephone system subscriber, and means located partly at each terminal station and including a line circuit between the two terminal stations to enable the operators at the terminal stations to transfer the connection between a passenger and a subscriber from one terminal station to the other terminal station with substantially no interruption to the communication when the vehicle is within range of said repeater station.

11. In a communication system for telephoning between a passenger on a vehicle moving between two terminal stations of its trackway and a subscriber of a public telephone system by space carrier telephone equipment having a limited effective range of transmission, a repeater station located between said terminal stations, said vehicle and repeater station each provided with said space telephone equipment, a public telephone system connection at each of said terminal stations, a control line circuit for each of said terminal stations, each said control line circuit extending from its terminal station to said repeater station and including a source of current and a manually operable switching means at the respective terminal station and a control relay at the repeater station, coupling means for each of said terminal stations and each said coupling means including contacts of the switching means and of the control relay for said line circuit of the same terminal station and being effective at times to couple said space telephone equipment of the repeater station to said public telephone system connection of the respective terminal station; lockout means for each terminal station and each said lockout means including a manually operable switch at the respective terminal station, another line circuit and a lock relay at the opposite terminal station; and circuit means at each said terminal station including contacts of the lock relay located at the same terminal station to render said coupling means of the respective terminal station ineffective.

ELBERT W. MARLOWE.

REFERENCES CITED

The following references are of record in the file of this patent:

UNITED STATES PATENTS

| Number | Name | Date |
|---|---|---|
| 1,448,523 | Conway | Mar. 13, 1923 |
| 2,393,291 | Clark | Jan. 22, 1946 |